(12) United States Patent
Jose et al.

(10) Patent No.: US 6,200,699 B1
(45) Date of Patent: Mar. 13, 2001

(54) MERCURY-FREE PRIMARY ALKALINE CELL

(75) Inventors: Horst-Udo Jose; Hans-Joachim Feistner, both of Ellwangen (DE)

(73) Assignee: Varta Batterie Aktiengesellschaft, Hannover (DE)

( * ) Notice: Subject to any disclaimer, the term of this patent is extended or adjusted under 35 U.S.C. 154(b) by 0 days.

(21) Appl. No.: 08/844,214

(22) Filed: Apr. 18, 1997

(30) Foreign Application Priority Data

Apr. 20, 1996 (DE) .............................................. 196 15 724

(51) Int. Cl.[7] .............................. H01M 4/50; H01M 4/42; H01M 4/48; H01M 10/34
(52) U.S. Cl. .............................. 429/59; 429/57; 429/224; 429/229; 429/231.6
(58) Field of Search ..................................... 429/224, 229, 429/59, 227, 57, 231.6

(56) References Cited

U.S. PATENT DOCUMENTS

| | | |
|---|---|---|
| 4,418,130 | 11/1983 | Soltis et al. . |
| 4,913,898 * | 4/1990 | Langan . |
| 5,128,222 * | 7/1992 | Yoshizawa et al. . |
| 5,164,274 * | 11/1992 | Kordesch et al. .................... 429/144 |
| 5,209,995 | 5/1993 | Tada et al. . |
| 5,464,709 * | 11/1995 | Getz et al. ........................... 429/229 |
| 5,532,085 * | 7/1996 | Davis et al. ......................... 429/224 |
| 5,626,988 * | 5/1997 | Daniel-Ivad et al. ................ 429/229 |

* cited by examiner

*Primary Examiner*—Maria Nuzzollilo
*Assistant Examiner*—Tracy Dove
(74) *Attorney, Agent, or Firm*—Schnader Harrison Segal & Lewis LLP

(57) ABSTRACT

A galvanic cell has an anode gel, an alkaline electrolyte, and a cathode material, separated from the anode gel by a separator. The anode gel has mercury-free zinc powder, and the cathode material has manganese dioxide, as well as salt-like calcium compounds in solid form.

33 Claims, 3 Drawing Sheets

MERCURY-FREE PRIMARY ALKALINE CELL

BACKGROUND OF THE INVENTION

1. Field of the Invention

The present invention relates to galvanic cells, and, in particular, to galvanic cells that comprise (a) an anode gel comprising mercury-free zinc powder, (b) an alkaline electrolyte, and (c) a cathode material that is separated from the anode gel by a separator and comprises manganese dioxide.

2. Description of the Related Art

Batteries of the abovementioned type are known as alkaline manganese primary cells. Because, on the grounds of protection of the environment, mercury is no longer being added to zinc powder, the anode material of cells of the abovementioned type is subject to increased corrosion which manifests itself in a higher self-discharge and a corresponding gassing rate. Numerous earlier attempts have been made to avoid these negative effects. For example, the zinc used as zinc powder has been alloyed with the metals bismuth, indium, lead, aluminum, and calcium (see U.S. Pat. No. 5,209,995). It is also known for the anode gel to be admixed with inorganic gassing inhibitors such as barium hydroxide (see U.S. Pat. No. 4,418,130). EP-A 582293 additionally discloses the addition of an indium salt to the electrolyte.

A further reduction of the gassing rate is desirable on the grounds of cost and with a view to improving the discharge behavior and increasing the capacity of the cells.

It is an object of the invention to provide a solution to the abovementioned problems.

Further aspects and advantages of this invention will become apparent from the detailed description which follows.

SUMMARY OF THE INVENTION

The object is achieved according to the invention in that the cathode material of cells of the abovementioned type comprises salt-like calcium compounds in solid form.

The present invention is directed to a galvanic cell, comprising (a) an anode gel comprising mercury-free zinc powder; (b) an alkaline electrolyte; and (c) a cathode material, separated from the anode gel by a separator and comprising manganese dioxide, wherein the cathode material further comprises salt-like calcium compounds in solid form.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention is directed to a galvanic cell, comprising (a) an anode gel comprising mercury-free zinc powder; (b) an alkaline electrolyte; and (c) a cathode material, separated from the anode gel by a separator and comprising manganese dioxide, wherein the cathode material further comprises salt-like calcium compounds in solid form.

The effect displayed by the addition, according to the invention, of, e.g., $Ca(OH)_2$ and/or $CaSO_4$ is very largely independent of the grade of zinc used or the alloy components it comprises. Hitherto, when electrolyte-containing cathode materials were used, an increase in cell gassing has been observed. This effect is due to increased tool wear and a concomitant introduction of heavy metals into the cathode material. By virtue of the addition according to the invention, gassing is brought back to the known level. It was also found that the addition according to the invention reduces gassing in partially discharged cells and improves the discharge capacity of the cells. The capacity that can be drawn from the cells is increased, both for constant discharge and for intermittent discharge.

The invention is explained in more detail with reference to FIGS. 1–6 and to the examples described below.

Figure 1:
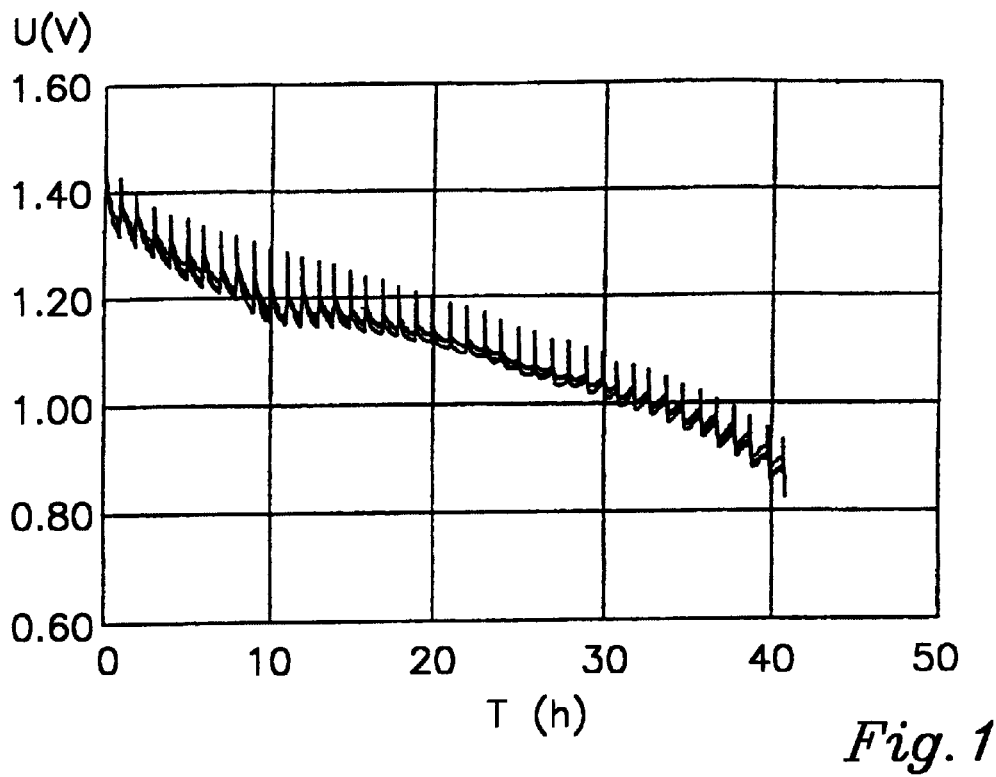
FIGS. 1 and 2 show the discharge curves of Comparative Example 1 and Example 1, respectively, for intermittent discharge of one hour twice a day (2×1 h/d), across a 3.9-ohm resistor of freshly fabricated cells.
Figure 2:
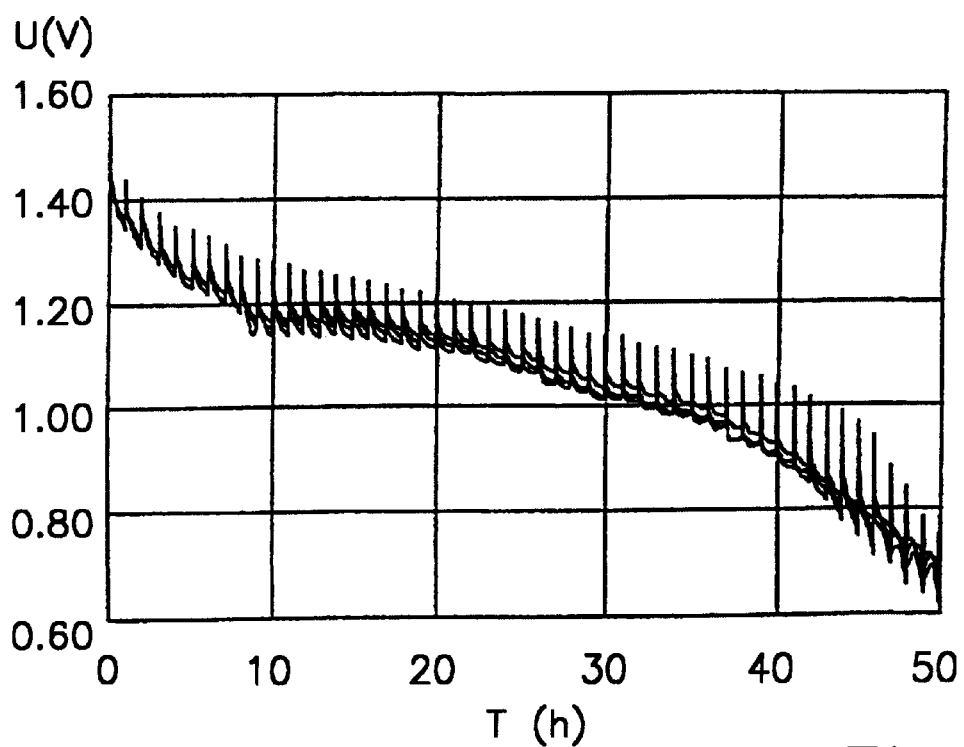

FIGS. 1 and 2 show the discharge curves of Comparative Example 1 and Example 1, respectively, for intermittent discharge of one hour twice a day (2×1 h/d), across a 3.9-ohm resistor of freshly fabricated cells, i.e., the storage time NO indicates cells that have not been stored.

Figure 3:
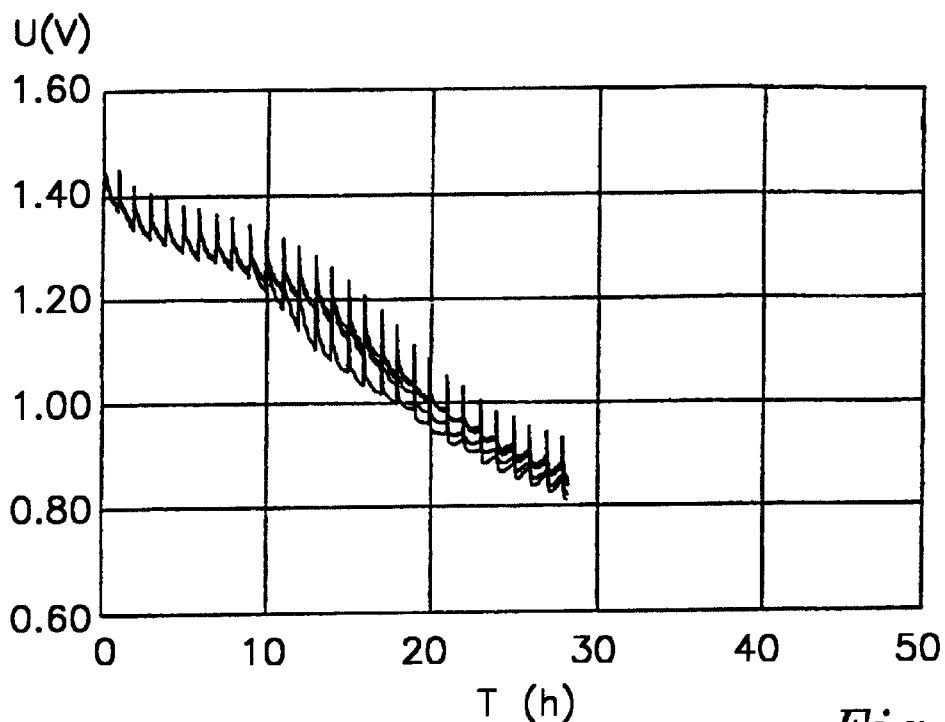
FIGS. 3 and 4 show the discharge curves of Comparative Example 1 and Example 1, respectively, under the same discharge conditions as mentioned above, after the cells had been stored for one month at 70° C. (MT 1)
Figure 4:
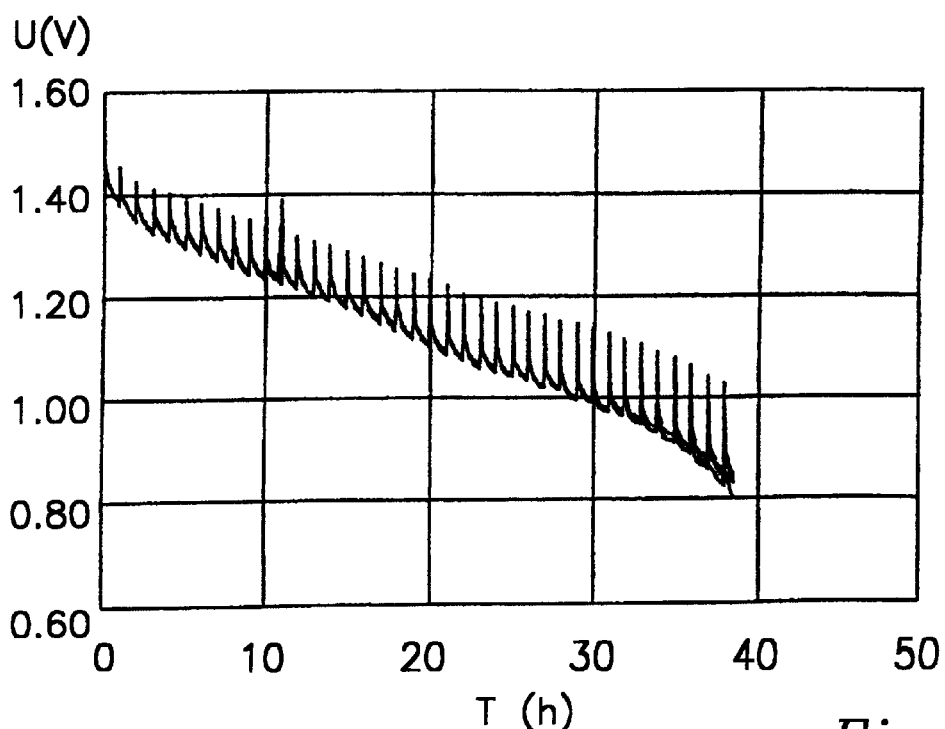

FIGS. 3 and 4 show the discharge curves of Comparative Example 1 and Example 1, respectively, under the same discharge conditions as mentioned above, after the cells had been stored for one month at 70° C. (MT 1).

Figure 5:
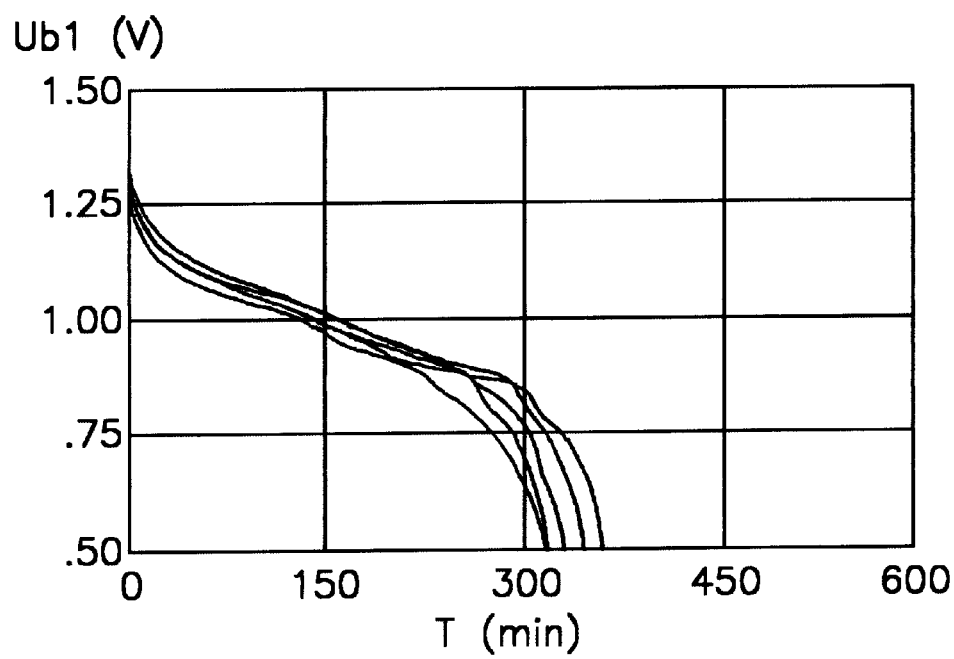
FIGS. 5 and 6 give the discharge curves of Comparative Example 3 and Example 3, respectively, which were obtained for constant discharge cross a 2-ohm resistor.
Figure 6:
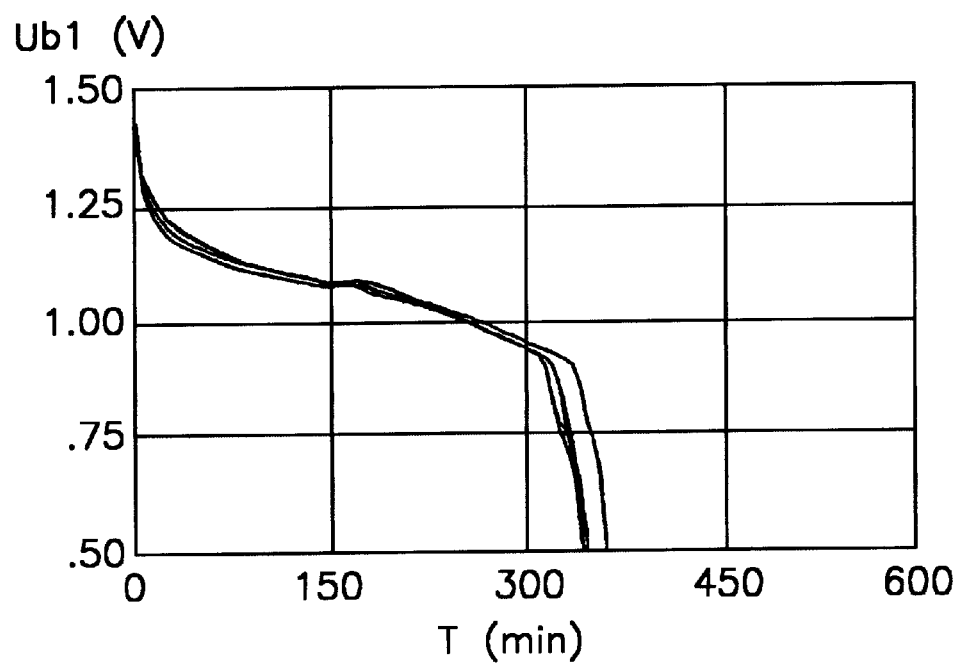

FIGS. 5 and 6 give the discharge curves of Comparative Example 3 and Example 3, respectively, which were obtained for constant discharge cross a 2-ohm resistor. The cells were stored for 7 days at 70° C. (7MT).

EXAMPLE 1

Forty experimental cells of size LR14 were assembled according to the following formulation:

Cathode material: Paste comprising 8500 g of $MnO_2$, 850 g of graphite, 50 g of $Ca(OH)_2$, 600 g of electrolyte (50% strength KOH);

Anode gel: 680.0 g of zinc powder, 5.0 g of thickener (carboxylated cellulose), 0.25 g of indium oxide, 0.04 g of $Ca(OH)_2$, 314.71 g of electrolyte;

Electrolyte: 760.0 g of 50% strength KOH, 20.0 g of ZnO, 220.0 g of $H_2O$; and

Separator: Separator basket made from two strips of polyvinyl alcohol fleece (nonwoven).

For each cell, there was used 32.7 g of cathode material, 4.0 g of electrolyte for impregnating the separator, and 16 g of anode gel. The cell jar used was a steel jar having a 0.2-$\mu$m nickel and a 0.2-$\mu$m cobalt coating.

COMPARATIVE EXAMPLE 1

Experimental cells of Comparative Example 1 were made similar to those of Example 1, except that they did not comprise any calcium hydroxide in the cathode material.

Tables 1 and 2 show comparison of the discharge characteristics of experimental cells made in accordance with Example 1 and Comparative Example 1, respectively. In each case, the values of cells that have not been stored (storage time NO=fresh) and after a storage time of 1 month (28 days) at 70° C. (MT1) were compared, the experimental cells in Table 1 being subjected to intermittent discharge of 2×1 hour a day (2×1 h/d) across a resistor R=6.8 Ω. This discharge mode is a model for discharge conditions in a portable tape recorder.

The discharge of the experimental cells in Table 2 took place under intermittent conditions, 4-minute discharge, 15-minute pause for 8 hours a day (4'/15' 8 h/d) across a 3.9 Ω resistor. This discharge mode is a model for discharge for lighting purposes.

EXAMPLE 2

Experimental cells of size LR20 were assembled according to the following formulation:

Cathode material: 8500 g of $MnO_2$, 850 g of graphite, 600 g of electrolyte (50% strength KOH);

Anode gel: 680.0 g of zinc powder, 5.0 g of thickener (carboxylated cellulose), 0.25 g of indium oxide, 0.04 g of $Ca(OH)_2$, 314.71 g of electrolyte (38% strength KOH+2% of ZnO); and Separator: Honeycomb separator made of PVA fleece.

Electrolyte: 760.0 g of 50% by weight of KOH, 20.0 g of ZnO, 220.0 g of $H_2O$.

For each cell, there was used, 69 g of cathode material, 9.0 g of electrolyte for impregnating the separator, and 37.5 g of anode gel. The cell jar used was a steel jar having a 0.2-$\mu$m nickel and a 0.2-$\mu$m cobalt coating.

COMPARATIVE EXAMPLE 2

Experimental cells of Comparative Example 2 were made similar to those of Example 2, except that they did not comprise any calcium hydroxide in the cathode material.

Table 3 shows the discharge characteristics at intermittent discharge, 2×one hour per day (2×1 h/d) across a resistor of 3.9 Ω and 2.2 Ω, respectively, as a model of discharging through a tape recorder, cells that had not been stored (N0) being compared with cells after a storage time of 1 month of 70° C. (MT1) and with cells that had been stored for 3 months at 45° C. (T3).

EXAMPLE 3

Experimental cells of size LR14 were assembled according to the following formulation:

Cathode material: Paste comprising 600 g of electrolyte, 8500 g of $MnO_2$, 850 g of graphite, 50 g of calcium hydroxide;

Anode gel: 680 g of zinc powder, 5.0 g of thickener, 0.25 g of indium oxide, 0.13 g of indium sulfate, 3.4 g of water, 0.12 g of calcium hydroxide, 311.10 g of electrolyte;

Electrolyte: 760 g of 50% strength KOH, 40.0 g of ZnO, 200.0 g of water; and

Separator: Honeycomb impregnated with 4.0 g of electrolyte.

For each cell, there was used 32.1 g of cathode material and 16 g of anode gel. The cell container used was a steel jar coated with 0.2-$\mu$m of nickel and 0.4-$\mu$m of cobalt.

Table 4 shows the discharge characteristics of the trial cells after storage times of N0, 7MT, and MT1 for constant discharge across a 2-ohm resistor.

The advantageous effect of the addition according to the invention can be observed, in particular, with intermittent discharge and, in that case, preferably after storage (7MT, MT1, or T3 storage). The differences in capacities in this situation may be up to 20%.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A mercury-free alkaline cell, comprising:
   (a) an anode gel consisting essentially of mercury-free zinc powder and from 0.0010 to 0.5% by weight of calcium hydroxide, based on the zinc fraction;
   (b) an alkaline electrolyte; and
   (c) a cathode material, separated from the anode gel by a separator, and comprising manganese dioxide and 0.1 to 0.5% by weight of a calcium salt in solid form selected from the group consisting of calcium hydroxide and calcium sulfate.

2. The cell as claimed in claim 1, wherein the anode gel further comprises from 50 to 500 ppm of indium oxide and/or indium sulfate.

3. A mercury-free alkaline cell, comprising:
   (a) an anode gel consisting essentially of mercury-free zinc powder and 0.0010 to 0.5% by weight of calcium hydroxide, based on the zinc fraction;
   (b) an alkaline electrolyte; and
   (c) a cathode material, separated from the anode gel by a separator and comprising manganese dioxide and 0.1 to 5% by weight of calcium sulfate and/or calcium hydroxide having a particle size of from 0.1 $\mu$m to 30 $\mu$m to inhibit gassing.

4. The cell as claimed in claim 3, wherein the anode gel further comprises from 50 to 500 ppm of indium oxide and/or indium sulfate.

5. A mercury-free alkaline cell, comprising:
   (a) an anode gel consisting essentially of mercury-free zinc powder and from 50 to 500 ppm of indium oxide and/or indium sulfate;
   (b) an alkaline electrolyte; and
   (c) a cathode material, separated from the anode gel by a separator, and comprising manganese dioxide and 0.1 to 0.5% by weight of a calcium salt, in solid form having a particle size of from 0.1 $\mu$m to 30 $\mu$m, selected from the group consisting of calcium hydroxide and calcium sulfate.

6. A mercury-free alkaline cell, comprising:
   (a) an anode gel consisting essentially of mercury-free zinc powder and from 50 to 500 ppm of indium oxide and/or indium sulfate;
   (b) an alkaline electrolyte; and
   (c) a cathode material, separated from the anode gel by a separator, and comprising manganese dioxide and from 0.1 to 0.5% of a calcium salt in solid form selected from the group consisting of calcium hydroxide and calcium sulfate for inhibiting gassing.

7. A mercury-free alkaline cell, comprising:
   (a) an anode gel consisting essentially of mercury-free zinc powder and a metal salt selected from the group consisting of calcium hydroxide, indium sulfate and indium oxide;
   (b) an alkaline electrolyte; and
   (c) a cathode material, separated from the anode gel by a separator, and comprising manganese dioxide and from 0.3 to 0.8% by weight of calcium hydroxide in solid form for inhibiting gassing.

8. The cell as claimed in claim 7, wherein the cathode material comprises the calcium salt in particle size of from 0.1 $\mu$m to 30 $\mu$m.

9. The cell as claimed in claim 8, wherein the anode gel further comprises from 50 to 500 ppm of indium oxide and/or indium sulfate.

10. The cell as claimed in claim 7, wherein the anode gel further comprises from 0.0010 to 0.5% by weight of calcium hydroxide, based on the zinc fraction.

11. The cell as claimed in claim 10, wherein the anode gel further comprises from 50 to 500 ppm of indium oxide and/or indium sulfate.

12. The cell as claimed in claim 7, wherein the anode gel further comprises from 50 to 500 ppm of indium oxide and/or indium sulfate.

13. A mercury-free alkaline cell, comprising:
   (a) an anode gel consisting essentially of mercury-free zinc powder and 0.0010 to 0.5% by weight of calcium hydroxide, based on the zinc fraction;
   (b) an alkaline electrolyte; and
   (c) a cathode material, separated from the anode gel by a separator, and comprising manganese dioxide and from 0.3 to 0.8% by weight of calcium hydroxide having a particle size of 0.1 $\mu$m to 30 $\mu$m to inhibit gassing.

14. The cell as claimed in claim 13, wherein the anode gel further comprises from 50 to 500 ppm of indium oxide and/or indium sulfate.

15. A mercury-free alkaline cell, comprising:
   (a) an anode gel consisting essentially of mercury-free zinc powder and from 0.0010 to 0.5% by weight of calcium hydroxide, based on the zinc fraction;
   (b) an alkaline electrolyte; and
   (c) a cathode material, separated from the anode gel by a separator, and comprising manganese dioxide and a gassing inhibiting amount of a calcium salt, in solid form having a particle size of from 0.1 $\mu$m to 30 $\mu$m, selected from the group consisting of calcium hydroxide and calcium sulfate.

16. The cell as claimed in claim 15, wherein the anode gel further comprises from 50 to 500 ppm of indium oxide and/or indium sulfate.

17. A mercury-free alkaline cell, comprising:
   (a) an anode gel consisting essentially of mercury-free zinc powder and from 0.0010 to 0.5% by weight of calcium hydroxide, based on the zinc fraction;
   (b) an alkaline electrolyte; and
   (c) a cathode material, separated from the anode gel by a separator, and comprising manganese dioxide and a gassing inhibiting amount of a calcium salt in solid form selected from the group consisting of calcium hydroxide and calcium sulfate.

18. The cell as claimed in claim 17, wherein the anode gel further comprises from 50 to 500 ppm of indium oxide and/or indium sulfate.

19. A mercury-free primary alkaline cell, comprising:
   (a) an anode gel comprising mercury-free zinc powder and from 0.0010 to 0.5% by weight of calcium hydroxide, based on the zinc fraction;
   (b) an alkaline electrolyte; and
   (c) a cathode material, separated from the anode gel by a separator and comprising manganese dioxide, wherein the cathode material further comprises a calcium salt in solid form.

20. The cell as claimed in claim 19, wherein the cathode material comprises from 0.1 to 5% by weight of calcium sulfate and/or calcium hydroxide.

21. The cell as claimed in claim 20, wherein the cathode material comprises from 0.3 to 0.8% by weight of calcium hydroxide.

22. The cell as claimed in claim 21, wherein:
   the cathode material comprises the calcium salt in particle size of from 0.1 $\mu$m to 30 $\mu$m; and
   the anode gel further comprises from 50 to 500 ppm of indium oxide and/or indium sulfate.

23. The cell as claimed in claim 19, wherein the cathode material comprises the calcium salt in particle size of from 0.1 $\mu$m to 30 $\mu$m.

24. The cell as claimed in claim 19, wherein the anode gel further comprises from 50 to 500 ppm of indium oxide and/or indium sulfate.

25. A mercury-free primary alkaline cell, comprising:
   (a) an anode gel comprising mercury-free zinc powder and calcium hydroxide;
   (b) an alkaline electrolyte; and
   (c) a cathode material, separated from the anode gel by a separator and comprising manganese dioxide and calcium hydroxide.

26. The cell as claimed in claim 25, wherein the cathode material comprises from 0.1 to 5% by weight of calcium hydroxide.

27. The cell as claimed in claim 26, wherein the cathode material comprises from 0.3 to 0.8% by weight of calcium hydroxide.

28. The cell as claimed in claim 27, wherein:
   the calcium hydroxide has a particle size of from 0.1 $\mu$m to 30 $\mu$m;
   the anode gel comprises from 0.0010 to 0.5% by weight of calcium hydroxide, based on the zinc fraction; and
   the anode gel further comprises from 50 to 500 ppm of indium oxide and/or indium sulfate.

29. The cell as claimed in claim 25, wherein the calcium hydroxide has a particle size of from 0.1 $\mu$m to 30 $\mu$m.

30. The cell as claimed in claim 25, wherein the anode gel comprises from 0.0010 to 0.5% by weight of calcium hydroxide, based on the zinc fraction.

31. The cell as claimed in claim 25, wherein the anode gel further comprises from 50 to 500 ppm of indium oxide and/or indium sulfate.

32. A mercury-free alkaline cell, comprising:
   (a) an anode gel consisting essentially of mercury-free zinc powder and 0.0010 to 0.5% by weight of calcium hydroxide, based on the zinc fraction;
   (b) an alkaline electrolyte; and
   (c) a cathode material, separated from the anode gel by a separator, and comprising manganese dioxide and a calcium salt in solid form selected from the group consisting of calcium hydroxide and calcium sulfate to inhibit gassing.

33. The cell as claimed in claim 32 wherein the anode gel further comprises from 50 to 500 ppm of indium oxide and/or indium sulfate.

* * * * *